(12) United States Patent
Ketterling

(10) Patent No.: US 12,736,148 B2
(45) Date of Patent: Sep. 15, 2026

(54) SPRINKLER VALVE BLOWOUT PLATE

(71) Applicant: KJ Ketterling Enterprises, LLC, Twin Falls, ID (US)

(72) Inventor: Kody J. Ketterling, Twin Falls, ID (US)

( * ) Notice: Subject to any disclaimer, the term of this patent is extended or adjusted under 35 U.S.C. 154(b) by 287 days.

(21) Appl. No.: 18/381,147

(22) Filed: Oct. 17, 2023

(65) Prior Publication Data

US 2025/0121393 A1 Apr. 17, 2025

(51) Int. Cl.
*F16K 27/02* (2006.01)
*F16K 27/00* (2006.01)

(52) U.S. Cl.
CPC .......... *F16K 27/0236* (2013.01); *F16K 27/00* (2013.01)

(58) Field of Classification Search
CPC ...... F16K 7/17; F16K 27/0236; F16K 31/126; F16K 2200/402; B08B 9/0321; B05B 15/52
See application file for complete search history.

(56) References Cited

U.S. PATENT DOCUMENTS 1,535,333 A * 4/1925 Morse ..................... F16K 15/03 251/284
11,583,903 B2 * 2/2023 Garcia .................. B08B 9/0321

FOREIGN PATENT DOCUMENTS

CN 112747131 A * 5/2021 ............. B01D 35/04
GB 615350 A * 1/1949 ........... B08B 9/0321

OTHER PUBLICATIONS

Machine English translation of CN-112747131-A (Year: 2025).*

* cited by examiner

*Primary Examiner* — Hailey K. Do
(74) *Attorney, Agent, or Firm* — Burdick Patents, P.A.; Sean D. Burdick; Colin L. Honan

(57) ABSTRACT

A blowout plate for removable attachment to the top surface an inline irrigation valve that has had its top works removed includes a generally elliptical plate having a centrally located outlet hole. The outlet hole is designed to be at least partially aligned with an outflow path of the valve. A plurality of apertures defining a variable mating profile for the blowout plate are defined through the plate proximate an outer perimeter of the plate. The variable mating profile is generated by unique combinations of the plurality of apertures to form a unique mating profile for attachment of the plate to a distinct valve with a corresponding screw hole pattern. The plate include a solid blank portion, or dead space, about the outlet hole and extending to the plurality of apertures that creates a watertight seal between the plate and a valve when the plate has been properly aligned thereabout.

13 Claims, 6 Drawing Sheets

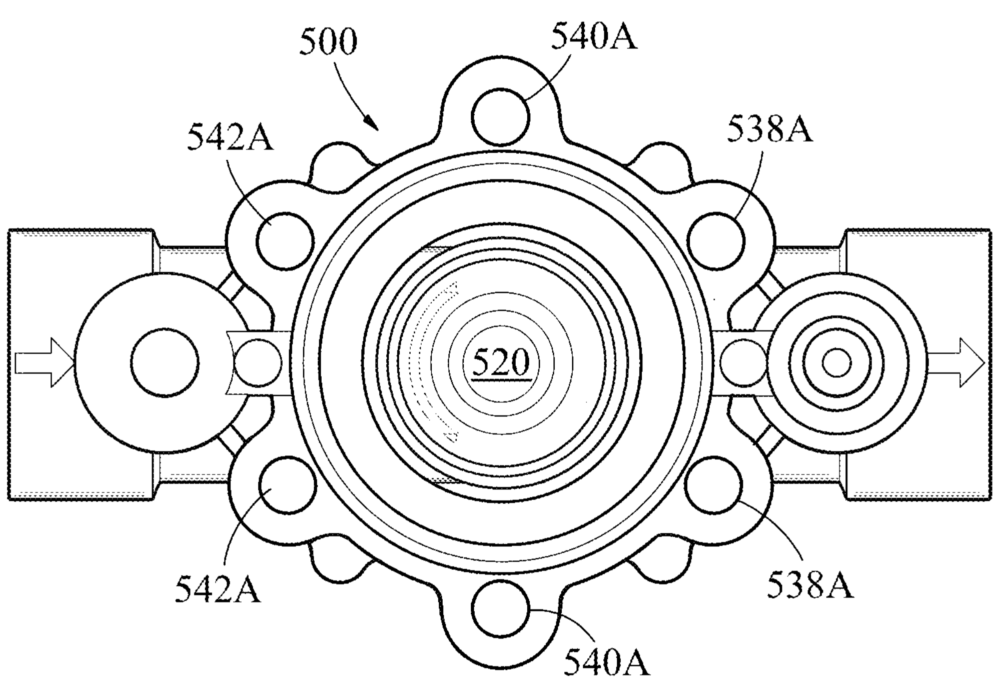
FIG. 5
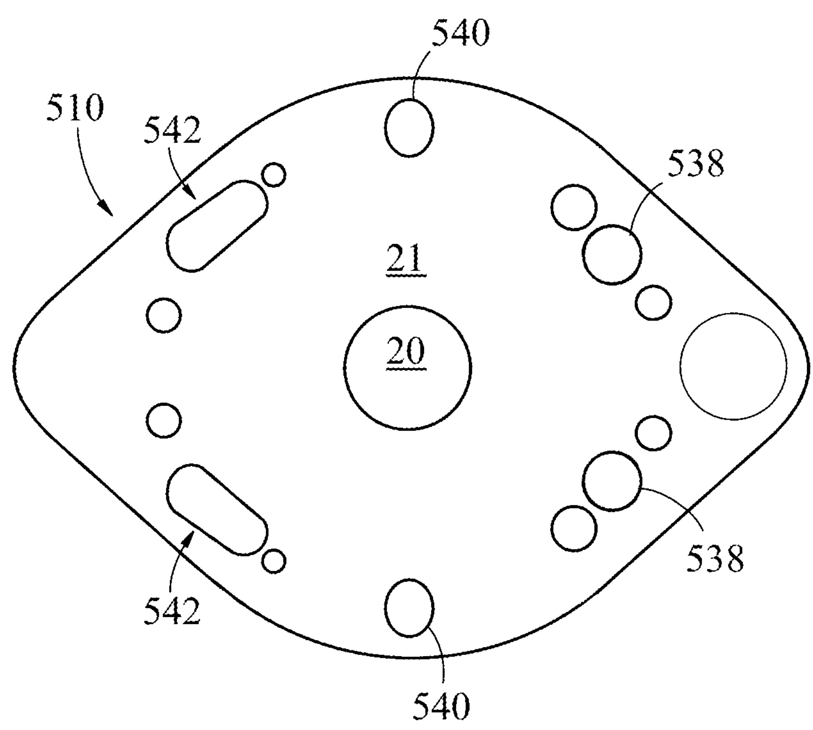

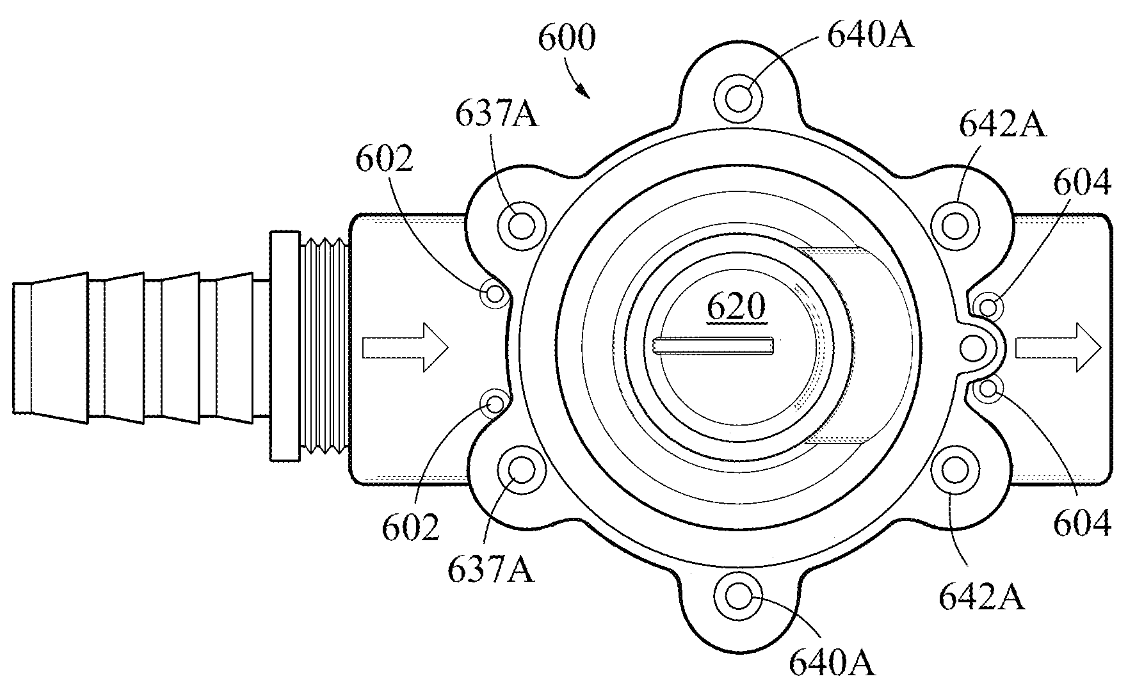
FIG. 6
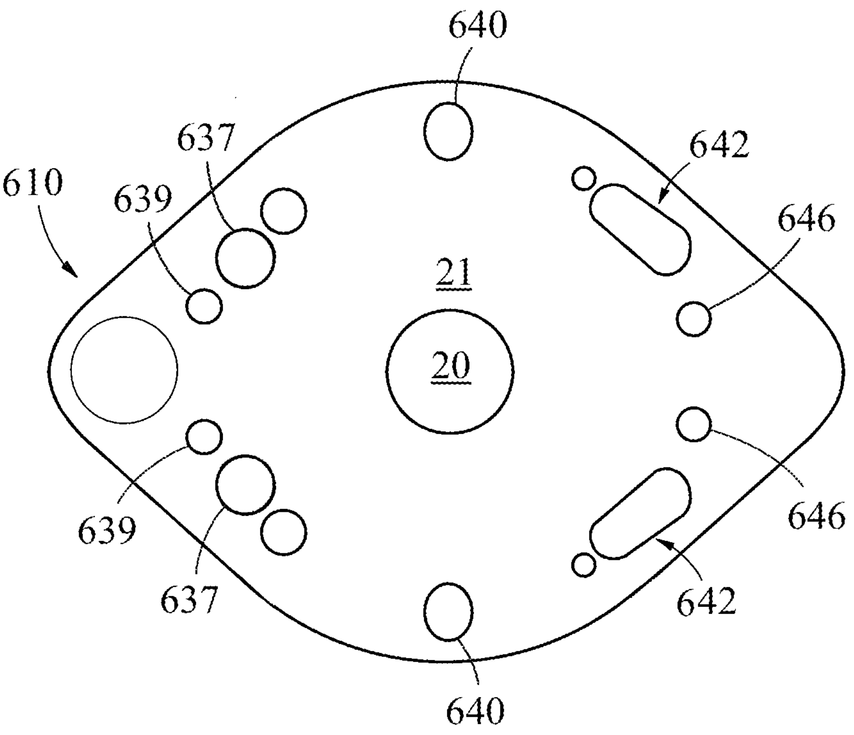

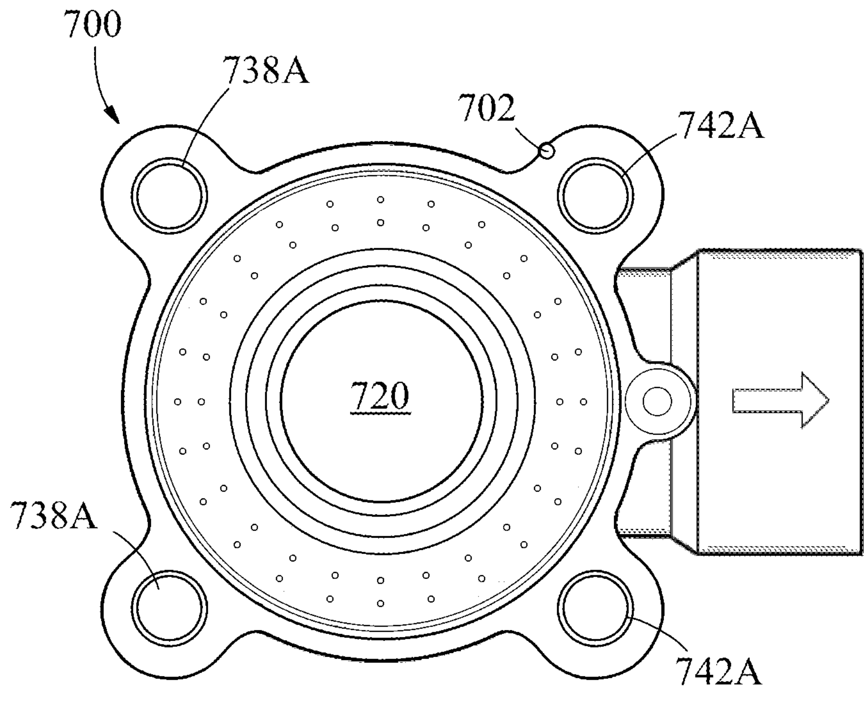
FIG. 7
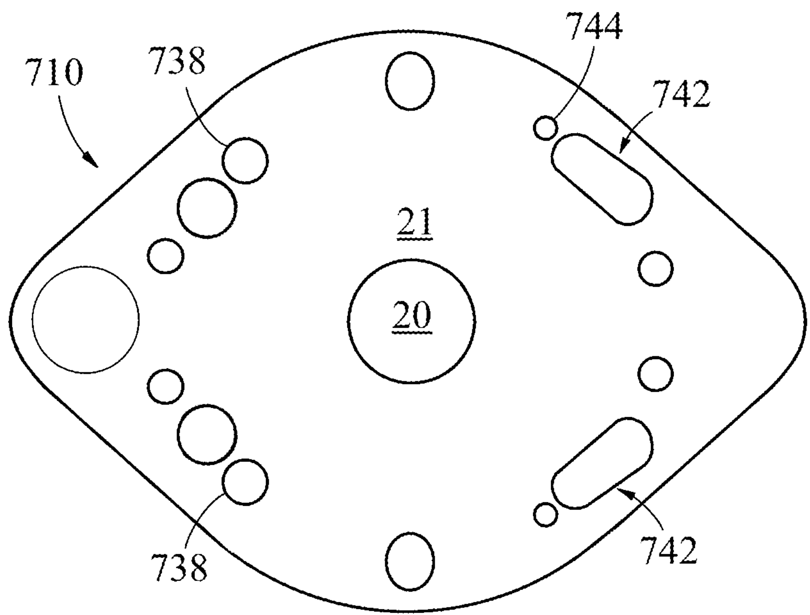

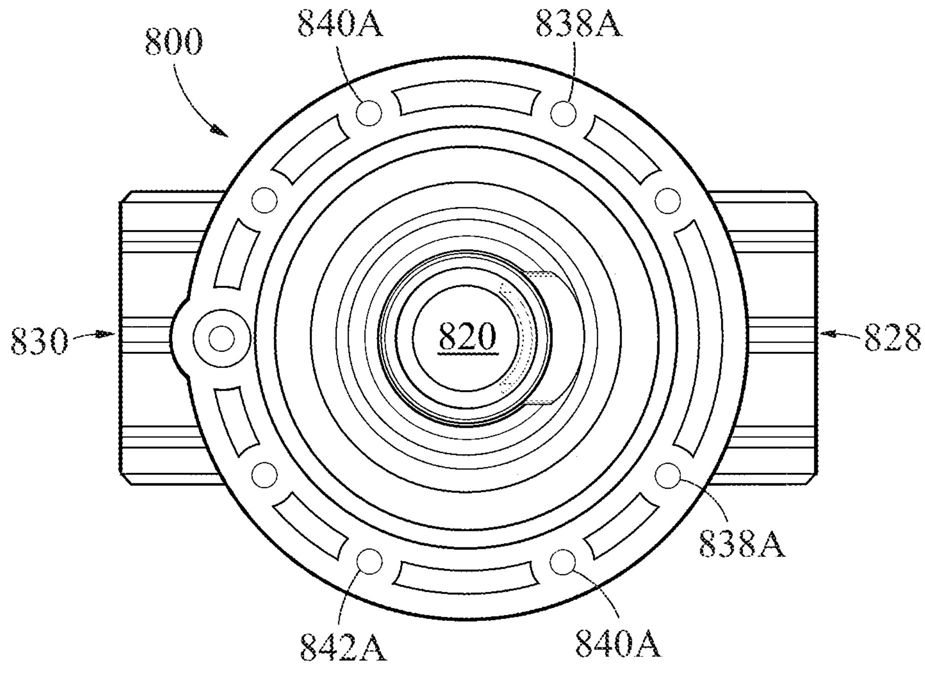
FIG. 8
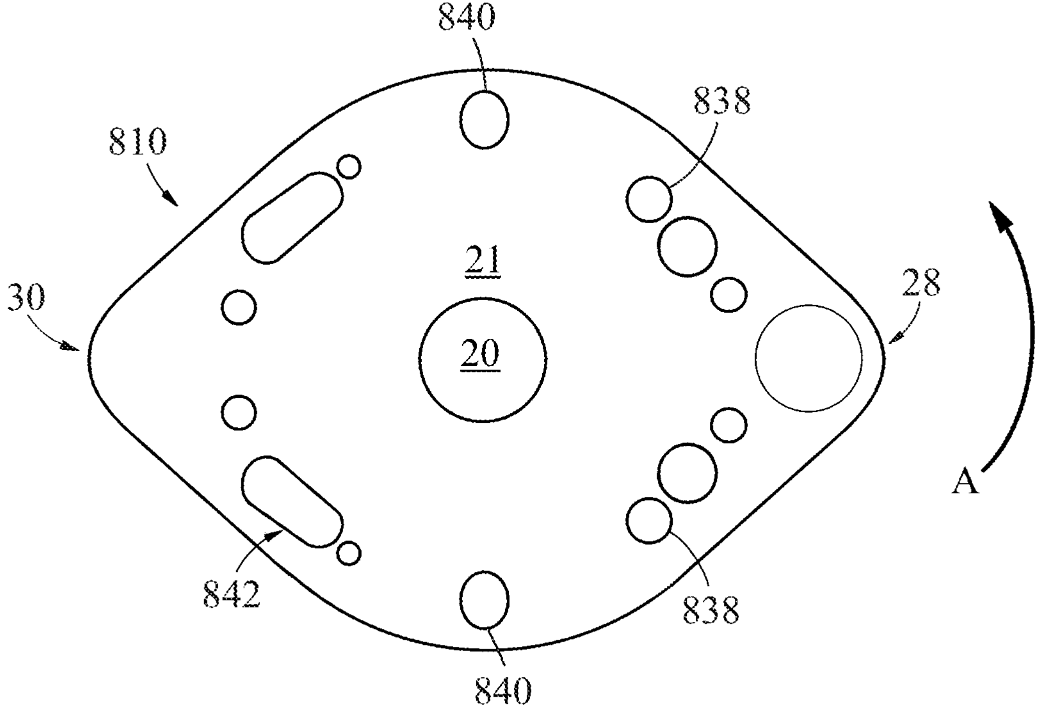

SPRINKLER VALVE BLOWOUT PLATE

BACKGROUND OF THE INVENTION

Field of the Invention

The present invention relates generally to irrigation systems, and more particularly to a valve blowout plate for lawn sprinklers and irrigation systems generally.

Description of Related Art

Valves for sprinklers and irrigation systems, particularly those installed in lawns and gardens, become clogged over time due to dirt build-up and debris accumulation in the immediate vicinity of the sprinkler valves. This causes blockage or reduction of the water flow through the affected valves, rendering the sprinkler unable to provide desired irrigation coverage.

A conventional solution is to simply disconnect the power source, shut off the water flow, remove the topworks of each valve, and flush clean water through the exposed valves. After a period of time, flushing is stopped and the sprinkler valve topworks are reassembled.

The conventional solution, however, risks accumulation of dirt and other debris into container boxes which often enclose sprinkler valves and within which flushing water tends to well up, thus reintroducing dirt and debris into the valve area. Other solutions involve using an air compressor, which is very useful for removing water from the sprinkler lines for winterization, but cost-effective air compressors are not designed for dirt removal in very damp environments and can cause significant damage to sprinkler lines if the compression rate is set too high or the compressor is used improperly.

What is needed is a cover plate that fits multiple makes and models of sprinkler valves and covers a valve during valve cleaning, that is inexpensive, easy to use, and that doesn't cause reintroduction of dirt and debris into the valve while the valve is exposed for cleaning.

SUMMARY OF THE INVENTION

The foregoing problems are overcome by a universal blowout plate according to the present invention. The blowout plate is removably attachable to the top surface of an inline valve that has had its top works removed, exposing an outflow path and screw pattern. In general, the blowout plate has means for connecting the plate to an inline valve and means for attaching a drain line thereto. The plate connection means allows the blowout plate to be universally deployed for use in connection with a variety of inline valves, regardless of the make and model of the valve.

In particular embodiments, the blowout plate is a generally elliptical plate, stretched at opposite ends, to form a stretched first end and a stretched second end. An outlet hole is defined through the plate and is designed to at least partially align with the exposed outflow path of the valve when the plate is aligned to the top surface of the valve. A plurality of apertures are defined through the plate and about an outer perimeter of the plate. The plate further includes a means for attaching the plate to the valve and a means for attaching a drain line to the outlet hole.

In some embodiments, the outlet hole is defined substantially through a center point of the plate and may include female threads. The drain line attachment means can include a threaded engagement between an external drain line and the female threads of the outlet hole. In alternative embodiments, the outlet hole may further include a barbed coupling extending therefrom. The barbed coupling may be used to removably attach a drain line thereto.

The plate also defines dead space, or a solid blank portion of the plate, that extends from the outlet hole to the plurality of apertures about the outer perimeter. The dead space creates a watertight seal between the plate and a valve when the plate has been properly aligned with and secured to the valve.

The plurality of apertures define a variable mating profile for the plate that is configured to substantially align with the screw hole pattern of a plurality of distinct valves. In some embodiments, the plate attachment means comprises the variable mating profile made up from the plurality of apertures positioned about the outer perimeter of the plate. The variable mating profile allows the blowout plate to be rotated about a top surface of a valve until a sufficient number of plate apertures are aligned with the valve screw hole pattern while the outlet hole is maintained in at least partial alignment with an outflow path.

In some alternative embodiments, an imaginary horizontal line extends from the first end to the second end to define a horizontal line of symmetry where an upper plate surface mirrors a lower plate surface. A portion of the plurality of apertures may define a mating profile for the lower plate surface that mirrors the mating profile of the upper plate surface. In some other embodiments, the plate attachment means can include the plurality of apertures arranged into distinct groupings about the perimeter of the lower plate surface. One such grouping may include at least circular apertures in line with one another and positioned proximate to the first end. A second grouping may include at least one aperture positioned substantially in the middle of the first and second ends and about the outer perimeter of the plate. A third grouping may include two circular apertures positioned on opposite sides of an elongated rectangular aperture. The apertures of the third grouping are in line with one another and positioned proximate to the second end. In preferred embodiments, the upper plate surface includes distinct groupings of apertures that substantially mirror those of the lower plate surface.

In further alternative embodiments, a blowout plate according to the present invention may include a lower plate surface at least partially covering a flow path of a valve that is exposed when the top works of the valve have been removed. The plate includes a means for attaching the plate to the valve and a means for channeling fluid from the flow path through the plate. The plate attachment means may include a plurality of apertures defined about an outer perimeter of the plate. The two or more of the plurality of apertures can be combined to define a unique mating profile for the plate. Each of the unique mating profiles are designed to allow the plate to align with a screw hole pattern of a valve while maintaining the fluid channeling means in proper alignment with the exposed flow path of the valve. In some embodiments, the fluid channeling means is an outlet hole defined substantially through a center point of the plate to at least partially align with the out flow path of a valve.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

FIG. 5 is a top view of an example of a Rain Bird® inline valve and a top view of an embodiment of a blowout plate, according to the present invention, highlighting the various apertures used to secure the plate to the depicted valve.

FIG. 6 is a top view of an alternative example of a Rain Bird® inline valve and a top view of an embodiment of a blowout plate, according to the present invention, highlighting the various apertures used to secure the plate to the depicted valve.

FIG. 7 is a top view of an example of a Hunter® inline valve and a top view of an embodiment of a blowout plate, according to the present invention, highlighting the various apertures used to secure the plate to the depicted valve.

FIG. 8 is a top view of an example of an Orbit® inline valve and a top view of an embodiment of a blowout plate, according to the present invention, highlighting the various apertures used to secure the plate to the depicted valve.

DETAILED DESCRIPTION OF THE DRAWINGS

A blowout plate according to the present invention consists primarily of a plate with a means for attachment to an inline valve and a means for directing an outflow of water from the plate. The attachment means are designed such that a single plate according to the present invention can be used across multiple different types of inline valves produced from a variety of different manufacturers. For example, the present invention is compatible with inline valves produced and manufactured by Orbit®, Rain Bird®, and Hunter®, as well as others. The present invention provides a user with a simple solution to clearing out buildup and debris in an irrigation line without having to flood the irrigation box or have such debris otherwise re-introduced therein, regardless of the maker of the inline irrigation valve.

Figure 1:
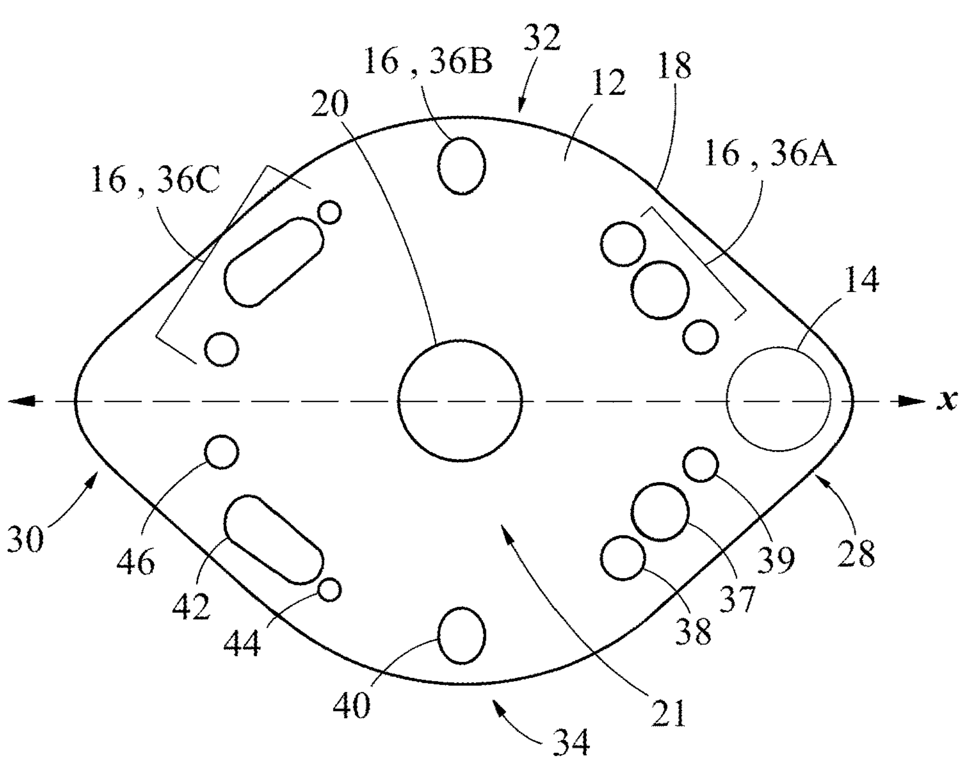
FIG. 1 is a top view of an embodiment of a blowout plate according to the present invention.

FIG. 1 is a top view of an embodiment of the blowout plate 10 according to the present invention. A top side 12 of the blowout plate 10 is symmetrical with an opposite bottom side (not shown) of the blowout plate. The blowout plate 10 has an outlet hole 20 defined therethrough. The outlet hole 20 is preferably defined substantially in the center of the blowout plate 10, however, other positions may also be acceptable within the scope of the present invention. The outlet hole 20 is configured to provide an outflow path to drain an inline valve when the blowout plate 10 has been installed thereon. In preferred embodiments, the outlet hole 20 has means for attaching a drain line to the blowout plate 10. Preferably, the attachment means is configured as female threads 24 formed on an interior wall 26 of the hole 20 for threaded engagement with an external drain line. In alternate embodiments, the outlet hole 20 may be designed with an integrated coupling for receiving an external drain line, such as a barbed coupling integrally formed to extend from the outlet hole.

In some embodiments, the blowout plate 10 has a generally circular configuration. In preferred embodiments, the blowout plate has a generally elliptical shape having a stretched or protruding first end 28 and a stretched or protruding second end 30. The first end 28 may also have a recessed portion 14 formed proximal thereto. The recessed portion 14 is configured to provide a user with a gripping surface to allow for easy handling of the blowout plate 10. The generally elliptical shape of the blowout plate 10 further forms a first apex 32 opposite a second apex 34. As can be clearly seen in FIG. 1, the blowout plate is symmetrical across a centerline X such that the first apex 32 substantially mirrors the second apex 34. The symmetrical design of the generally elliptical shaped blowout plate 10 aids in the universality of the present invention.

The blowout plate 10 may be formed according to conventional injection molding techniques using any known polymer material. Alternatively, the blowout plate 10 may be machined from planar stock according to known techniques. Regardless of the manufacturing method, the blowout plate 10 must be rigid and durable enough to withstand general handling and transport in the field.

The blowout plate 10 also has a means for attaching the blowout plate to an inline valve. In preferred embodiments, the attachment means is configured as a plurality of apertures 16 spaced about an outer perimeter 18 of the blowout plate 10. The apertures 16 may receive a fastener, such as a screw, to securely attach the blowout plate 10 to an inline valve. The apertures 16 are designed to be symmetrical about the centerline X. In preferred embodiments, there is dead space 21 between the outlet hole 20 and each of the plurality of apertures 16. As used herein, reference to the dead space 21 is made with regard to the solid portion of the blowout plate 10 about the outer perimeter of the outlet hole 20 and extending to each of the plurality of apertures 16.

The apertures 16 have various designs to give the blowout plate 10 multiple different mating profiles depending on the alignment of the plate on an inline valve. The blowout plate 10 is designed such that, through the simple rotation of the plate, a user can align at least one of the apertures 16 to the mating profile of an inline valve and tighten the plate thereon while maintaining proper alignment between the valve outflow and the outlet hole 20 of the blowout plate. Depending on the inline valve the blowout plate 10 is attached to, a user may be able to align more than one aperture 16 to provide for a more secured engagement between the components. Preferably, the mating profile of the blowout plate 10 is designed such that at least two apertures 16 can be used to secure the plate 10 to an inline valve.

In preferred embodiments, there is multiple groupings 36A, 36B and 36C of the apertures 16 defined along the perimeter 18 of the blowout plate 10. The groupings 36A, 36B, 36C are preferably distinct from one another to ensure the blowout plate 10 can be rotated so that the mating profile substantially matches various distinct mating profiles of various inline valves. In grouping 36A, there is at least three circular apertures 37, 38, 39 defined through the blowout plate 10 and formed substantially in line with one another proximate to the perimeter 18. The circular apertures 37, 38, 39 may all have the same diameter or may have different diameters designed to receive different sized fasteners therethrough. In embodiments where the circular apertures have differing diameters, each of the circular aperture 37, 38 and 39 may be sized and positioned to be useful for a specific mating profile for a specific inline valve.

Grouping 36B comprises a single oval shaped aperture 40 defined substantially at the apexes 32, 34 of the blowout plate 10. In alternate embodiments not illustrated, there may be multiple oval shaped apertures 40 that may be formed in line along the perimeter 16 or positioned vertically one after the other. Having multiple oval shaped apertures 40 along the perimeter 18 or stacked vertically may increase the universality of the blowout plate 10 by providing additional apertures for engaging the blowout plate to the inline valve.

Grouping 36C is defined substantially at the second end 30 of the blowout plate 10. Grouping 36C has an elongated rectangular aperture 42 with a first and second circular apertures 44, 46 positioned substantially in line therewith along the perimeter 18. The elongated rectangular aperture 42 is designed so that when a fastener has been inserted through the aperture 42 and lightly engaged to an inline valve, the blowout plate 10 may be repositioned about the top of the valve so that one or more apertures 16 from groupings 36A and 36B can be positioned to align with the given mating profile of the inline valve. The first and second circular apertures 44, 46 may also be used to appropriately position and match the blowout plate 10 to a given mating profile on an inline valve.

Figure 2:
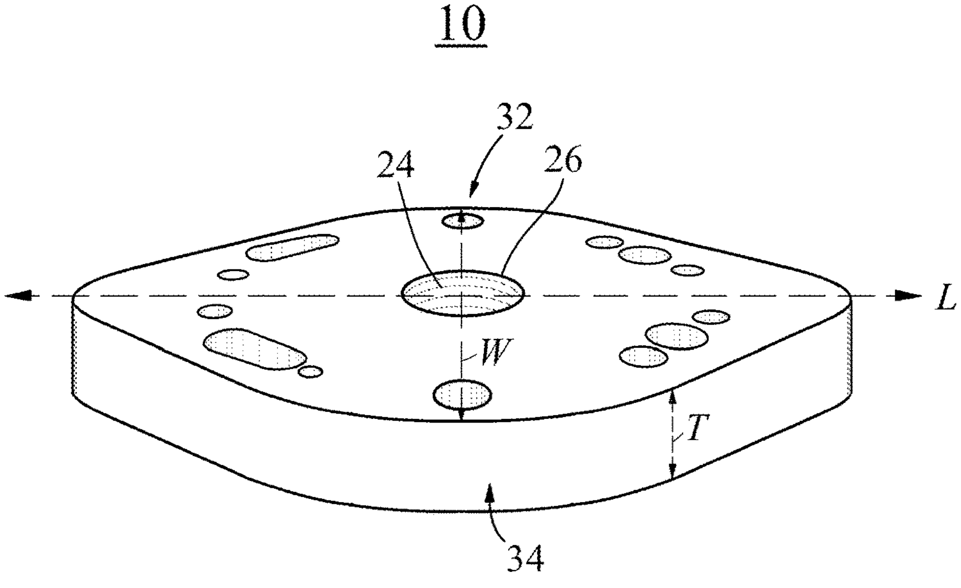
FIG. 2 is a side perspective view of an embodiment of a blowout plate.

FIG. 2 is a top perspective view of an embodiment of the blowout plate 10 according to the present invention. In preferred embodiments, the blowout plate 10 has the generally elliptical shape, as described above. A width W is measured from apex 32 to apex 34. Width W is preferably between about 2" to about 5" and most preferably about 3¼". A length L is measured from the first end 28 to the second end 30. Preferably, the length L is between about 3" and 7" and most preferably about 4⅜". The blowout plate 10 further has a thickness T. The thickness T of the blowout plate may be between about ¼" to 1" but is preferably about ½" thick.

Figure 3:
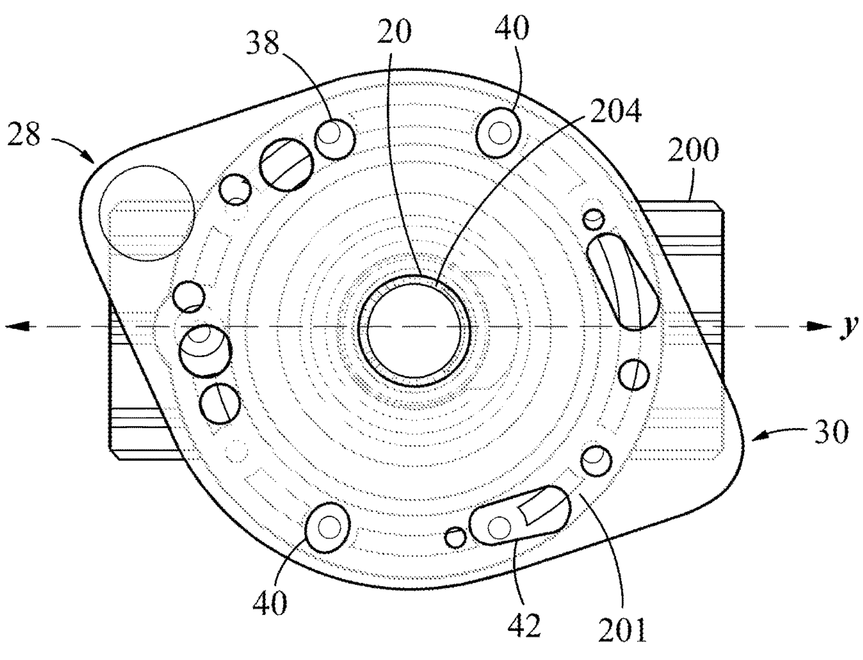
FIG. 3 is a partially transparent top view of an embodiment of a blowout plate attached to the top surface of a generic inline valve.

FIG. 3 is a partially transparent top view of a generic inline valve 200, illustrating a generic mating profile 201, removably attached to one embodiment of the blowout plate 10. As can be seen, the blowout plate 10 is designed such that a plurality of the apertures 16 align with the mating profile 201 of the inline valve 200. Note, not all apertures 16 will align with the mating profile 201 of the inline valve 200. Connection of the blowout plate 10 to an inline valve 200 is accomplished by aligning at least one aperture 16 to the mating profile 201 of the inline valve. The blowout plate 10 is configured to partially align with the mating profile 201 of the inline valve 200 such that the outlet hole 20 is substantially aligned with the outflow 204 of the valve.

In the illustrated embodiment of FIG. 3, the connection between the blowout plate 10 and the inline valve 200 is accomplished by rotating the blowout plate so that the centerline X is slightly misaligned from the centerline Y of the inline valve allowing for at least five apertures 16 to be aligned with mating profile 201 of the valve. In the exemplary illustration of FIG. 3, this is accomplished by aligning a total of four apertures 16: at least one aperture 38, two of apertures 40 and at least one of aperture 42 with the corresponding apertures on the valve 200 defining the mating profile 201.

Engagement between the blowout plate 10 and the inline valve 200 is designed to create a watertight seal therebetween to ensure water does not escape or otherwise leak into the area surrounding the inline valve. The dead space 21 of the blowout plate 10 is designed to create a seal between the outflow 204 and the blowout plate 10 when the plate is engaged to an inline valve 200. To ensure a more secured engagement between the component parts, the blowout plate 10 may be rotated slightly until additional apertures 16 align with the mating profile 201 of the valve 200 while maintaining the alignment between the outlet hole 20 and the outflow 204. The number of apertures 16 that will align with the mating profile 201 depends on the make and model of the inline valve. Once properly aligned, fasteners 202 are used to secure the blowout plate 10 to the inline valve 200 via the properly aligned apertures 16. The fasteners 202 may be the screws that were used to secure the top works (not depicted) to the inline valve 200.

Figure 4:
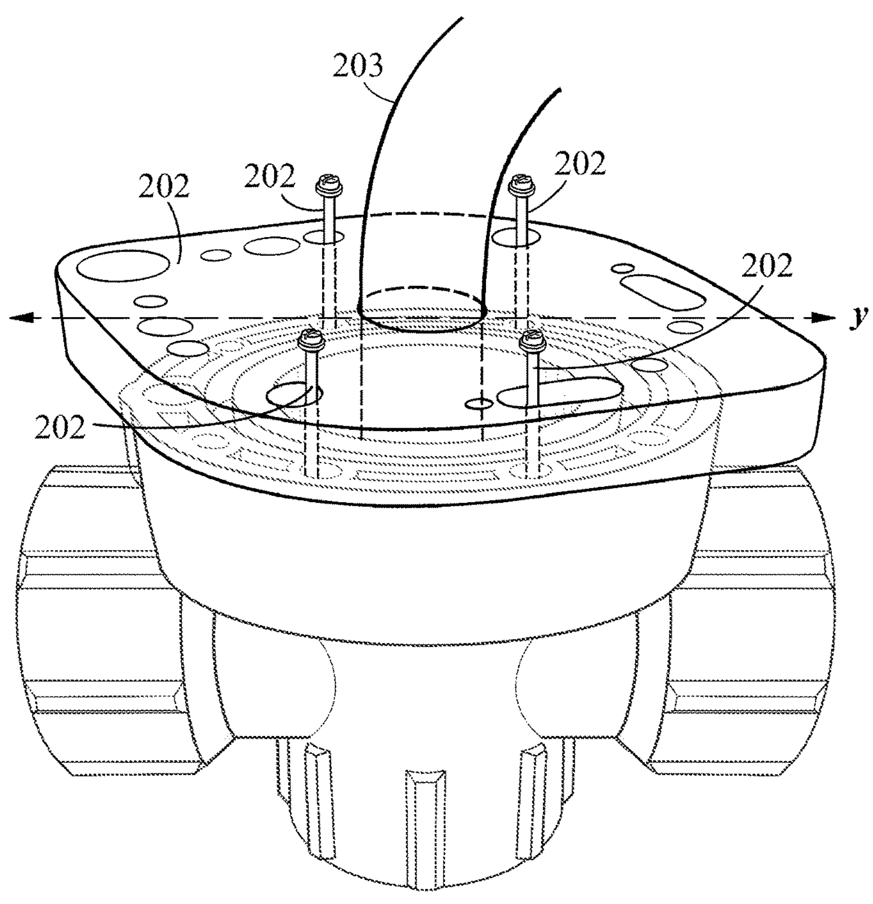
FIG. 4 is a partially transparent perspective view of an embodiment of a blowout plate attached to a generic inline valve.

FIG. 4 is a partially transparent perspective view of the blowout plate 10 connected to the conventional inline valve 200. With the blowout plate 10 connected to the valve 200, a drain line 203 may be engaged to the outlet hole 20. The drain line 203 may be simple tubing that has male threads at one end thereof and be of a sufficient length to ensure the fluid and debris being cleared out from the irrigation system can be directed to a desired location away from the irrigation box. In alternate embodiments where the outlet hole 20 has an integral coupling extending therefrom, the drain line 101 does not require male threading and instead can engage the blowout plate via friction fit engagement.

FIG. 5 is a top view of a Rain Bird® inline valve 500 with a top view of a blowout plate 510 depicted beside it to highlight the mating profile thereof. The valve 500 is an exemplary depiction of Rain Bird® valve from the DV Series of Inline Plastic Residential Irrigation Valves. The Rain Bird® valve 500 mates with the blowout plate 510 by aligning outlet hole 20 with the outflow 520 so that the dead space 21 substantially blocks the remaining larger diameter of the outflow 520 to create a seal therebetween. The blowout plate 510 is secured by aligning the plate on the valve 500 so that at least apertures 538, 540 and 542 substantially align and engage with corresponding receiving holes 538A, 540A and 542A defined in the top surface of the valve 500. Fasteners, such as screws, can thereafter be inserted through the apertures to secure the plate 510 to the top surface of the valve 500. Notably, the receiving holes 538A, 540A and 542A will already have internal threads for receiving and securing the top works of the valve 500 and therefore provides the means for threadably engaging the fasteners inserted through the apertures 538, 540, 542 of the blowout plate 510.

FIG. 6 is a top view of a second Rain Bird® inline valve 600, also from the Rain Bird® DV Series of Inline Plastic Residential Irrigation Valves. A blowout plate 610 is depicted below the valve 600 to highlight the mating profile thereof. The valve 600 has a pair of rear posts 602 and forward posts 604 that engage an outer surface of the top works (not depicted) to aid in the alignment and securement of the top works to the valve 600. The rear posts 602 and forward posts 604 similarly aid in aligning the blowout plate 610 about the top surface of the valve 600 so that the outlet hole 20 is substantially aligned with the outflow 620 of the valve. The rear posts 602 engage with apertures 639 and the forward posts 604 engage with apertures 646 to align the blowout plate 610 on the valve 600. The blowout plate 610 is thereafter secured to the valve 600 through the use of fasteners received through one or more apertures aligned therebetween. For instance, with the posts 602, 604 engaged with the apertures 639, 646, respectively, the apertures 640 can be readily aligned with the corresponding receiving holes 640A on the valve to insert and engage fasteners thereto. Similarly, apertures 637 are readily aligned with corresponding receiving holes 637A on the valve. Finally, a portion of the elongated rectangular apertures 642 can be aligned with corresponding receiving holes 642A. The fasteners are thereafter inserted through each of the aligned apertures to secure the blowout plate 610 to the valve 600 thereby creating a watertight seal between dead space 21 about the outflow 620 to ensure fluid can only escape through the outlet hole 20 of the plate.

FIG. 7 is a top view of a Hunter® inline valve 700 next to a blowout plate 710 highlighting the mating profile therebetween. The inline valve 700 is an exemplary depiction of a type of Hunter® PGV Valve. The valve 700 has a post 702 that is used to properly orient and align the top works (not depicted) about the top surface of the valve. The post 702 aligns and engages with aperture 744 of the blowout plate 710. Alignment of the post 702 with aperture 744 allows an operator to readily align the remaining apertures necessary to secure the plate 710 to the valve 700 while ensuring the outlet hole 20 is maintained in proper alignment with the outflow 720. Apertures 738 of the plate 710 are aligned and engaged with receiving holes 738A of the valve 700 while a portion of the elongated rectangular apertures 742 are aligned and engaged with receiving holes 742A of the valve 700. The blowout plate 710 is larger than the exemplary embodiment of the Hunter® valve 700 depicted and therefore proper alignment is essential to ensuring the dead space 21 of the plate 710 completely covers the diameter of the valve outflow 720 to create the watertight seal therebetween and only provide an escape for fluid through the outlet hole 20.

FIG. 8 is a top view of an Orbit® inline valve 800 and a top view of an embodiment of a blowout plate 810 highlighting the mating profile therebetween. Blowout plate 810 engages to the valve 800 by first aligning the outlet hole 20 with the outflow 820 of the valve. The blowout plate 810 thereafter must be slightly rotated, in the general direction of arrow A, so that the first end 28 and the second end 30 are misaligned and off-center with regard to the forward end 828 and back end 830 of the valve 800. In this position, an operator can readily align several apertures 16 with the mating profile of the valve 800. In particular, apertures 838 are aligned with corresponding receiving holes 838A. Similarly, apertures 840 and at least one aperture 842 are aligned with and engaged to corresponding receiving holes 840A and 842A. Fasteners are thereafter inserted into the aligned apertures to secure the blowout plate 810 to the valve 800.

As described above, the blowout plate 10 may be connected to multiple distinct inline valve types through the simple rotation of the plate on top of the valve until a sufficient number of apertures 16 have been aligned to match the mating profile 201 of the valve and the outlet hole 20 is partially aligned with an outflow 204 of the valve. As can be seen by comparing the mating profiles of the various illustrated valves, the exact engagement between the blowout plate and the valve will be dependent on the make and model of the valve. Thus, the orientation and alignment of the blowout plate on the valve will depend on the make and model of the valve. However, regardless of the make and model of the valve, the blowout plate 10 is designed such that when properly aligned and connected, there is a watertight seal created between the dead space 21 and the outflow 204 of the valve so that fluid can only escape from the outlet hole 20 of the attached blowout plate.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A blowout plate for cleaning debris out of an inline valve having removable top works, wherein the removable top works have been removed from the inline valve exposing an outflow path in the inline valve and a screw hole pattern for removably connecting the top works, the blowout plate comprising:

- a generally elliptical plate having a stretched first end opposite a stretched second end, an outlet hole defined through the generally elliptical plate and configured to at least partially align with the exposed outflow path, a plurality of apertures defined about an outer perimeter of the generally elliptical plate, a top surface, a bottom surface opposite the top surface, and a substantially uniform thickness formed between the top surface and the bottom surface;
- a means for attaching the generally elliptical plate to the inline valve; and
- a means for attaching a drain line to the outlet hole;
- wherein an imaginary horizontal line extends from the stretched first end to the stretched second end to define a horizontal axis of symmetry defining the top surface and the bottom surface;
- wherein the plurality of apertures is arranged into at least three distinct groupings about the perimeter of the bottom surface; and
- wherein a first grouping of apertures comprises at least three substantially circular apertures defined in line about the outer perimeter of the generally elliptical plate proximate the stretched first end.

2. The blowout plate of claim 1, wherein the outlet hole is defined substantially through a center point of the generally elliptical plate.

3. The blowout plate of claim 1, wherein the plurality of apertures forms a mating profile on the bottom surface that substantially mirrors a mating profile of the top surface.

4. The blowout plate of claim 1, wherein the substantially uniform thickness is between about 0.25 inches and 0.75 inches.

5. The blowout plate of claim 1, wherein the plurality of apertures defines a variable mating profile configured to substantially align with a screw hole pattern of a plurality of distinct valves.

6. The blowout plate of claim 5, wherein the means for attaching the generally elliptical plate to the inline valve comprises the plurality of apertures defined about the outer perimeter and forming the variable mating profile.

7. The blowout plate of claim 1, further comprising dead space about the outlet hole and extending to the plurality of apertures.

8. The blowout plate of claim 7, wherein the dead space is a solid, blank portion of the generally elliptical plate configured to create a watertight seal between the generally elliptical plate and the inline valve when the outlet hole is at least partially aligned with the exposed outflow path.

9. The blowout plate of claim 1, wherein the outlet hole further comprises female threads.

10. The blowout plate of claim 9, wherein the means for attaching a drain line to the outlet hole comprises a threaded engagement between a drain line and the outlet hole.

11. The blowout plate of claim 1, wherein a second grouping of apertures comprises at least one aperture defined about the outer perimeter of the generally elliptical plate and substantially in the middle of the stretched first end and the stretched second end.

12. The blowout plate of claim 11, wherein a third grouping of apertures comprises at least two circular apertures positioned on opposite sides of a third, elongated rectangular aperture, wherein the third grouping of apertures is defined about the outer perimeter of the generally elliptical plate proximate the stretched second end.

13. The blowout plate of claim 12, wherein the top surface comprises distinct groupings of the plurality of apertures which substantially mirror the three aperture groupings of the bottom surface.

* * * * *